US012794832B2

(12) United States Patent
Williams

(10) Patent No.: US 12,794,832 B2
(45) Date of Patent: Nov. 10, 2026

(54) COMMUNICATION LATENCY MITIGATION FOR ON-CHIP NETWORKS

(71) Applicant: Tesla, Inc., Austin, TX (US)

(72) Inventor: Douglas R. Williams, Mountain View, CA (US)

(73) Assignee: Tesla, Inc., Austin, TX (US)

( * ) Notice: Subject to any disclaimer, the term of this patent is extended or adjusted under 35 U.S.C. 154(b) by 255 days.

(21) Appl. No.: 18/683,592

(22) PCT Filed: Aug. 16, 2022

(86) PCT No.: PCT/US2022/040497

§ 371 (c)(1),
(2) Date: Feb. 14, 2024

(87) PCT Pub. No.: WO2023/023080

PCT Pub. Date: Feb. 23, 2023

(65) Prior Publication Data

US 2024/0356867 A1 Oct. 24, 2024

Related U.S. Application Data

(60) Provisional application No. 63/235,018, filed on Aug. 19, 2021.

(51) Int. Cl.
*H04L 49/109* (2022.01)
*H04L 45/745* (2022.01)

(52) U.S. Cl.
CPC .......... *H04L 49/109* (2013.01); *H04L 45/745* (2013.01)

(58) Field of Classification Search
CPC ...... H04L 49/109; H04L 45/745; G06F 13/42
See application file for complete search history.

(56) References Cited

U.S. PATENT DOCUMENTS 8,724,628 B1 * 5/2014 Aybay .................. H04L 49/101 370/422
9,246,838 B1 1/2016 Shen et al.
(Continued)

FOREIGN PATENT DOCUMENTS

| | | |
|---|---|---|
| JP | 57-212847 | 12/1982 |
| JP | 2004-054419 | 2/2004 |
| JP | 2018-514872 | 6/2018 |

OTHER PUBLICATIONS

International Search Report and Written Opinion mailed Dec. 5, 2022 in International Patent Application No. PCT/US2022/040497, in 8 pages.

*Primary Examiner* — Tonia L Dollinger
*Assistant Examiner* — Mehulkumar J Shah
(74) *Attorney, Agent, or Firm* — Knobbe, Martens, Olson & Bear, LLP

(57) ABSTRACT

This application relates to systems and methods for reduced latency in arrays of computing nodes. In some embodiments, a method of routing data can include outputting a first bypass signal and a second bypass signal from a first computing node of an array of computing nodes, wherein the first bypass signal indicates to route packet data through a second computing node and the second bypass signal indicates to turn the packet data in a third computing node. The packet can be routed through the second node based on the first bypass signal in a single clock cycle, and the packet can be routed from the second computing node to the third computing node in a single clock cycle. The second computing node receives the first bypass signal by way of a faster route than it receives the packet data.

20 Claims, 7 Drawing Sheets

(56) References Cited

U.S. PATENT DOCUMENTS

| | | | | |
|---|---|---|---|---|
| 10,601,732 | B1 | 3/2020 | Peterson | |
| 2005/0238032 | A1* | 10/2005 | Hesse | H04L 49/257 370/401 |
| 2006/0209709 | A1* | 9/2006 | Kovacevic | H04N 21/23424 370/252 |
| 2008/0025313 | A1 | 1/2008 | Lu | |
| 2008/0082786 | A1* | 4/2008 | Lovell | G06F 15/76 712/15 |
| 2009/0182944 | A1* | 7/2009 | Comparan | G06F 12/0888 711/146 |
| 2014/0064062 | A1* | 3/2014 | Taillon | H04L 45/28 370/392 |
| 2014/0122560 | A1* | 5/2014 | Ramey | G06F 15/17312 709/201 |
| 2014/0219097 | A1* | 8/2014 | Gratz | H04L 49/1576 370/235 |
| 2015/0071282 | A1* | 3/2015 | Anders | H04L 12/6418 370/353 |
| 2017/0024346 | A1* | 1/2017 | Wang | H04L 45/00 |
| 2017/0272059 | A1* | 9/2017 | Chen | H04B 1/18 |
| 2018/0097719 | A1* | 4/2018 | Tambakuwala | H04L 45/22 |
| 2020/0195584 | A1 | 6/2020 | Reed | |

* cited by examiner

COMMUNICATION LATENCY MITIGATION FOR ON-CHIP NETWORKS

CROSS-REFERENCE TO RELATED APPLICATION

This application is a U.S. national phase application under 35 U.S.C. § 371 of International Application No. PCT/US2022/040497, titled "COMMUNICATION LATENCY MITIGATION FOR ON-CHIP NETWORKS," and filed Aug. 16, 2022, which claims the benefit of U.S. Provisional Patent Application No. 63/235,018, titled "COMMUNICATION LATENCY MITIGATION FOR ON-CHIP NETWORKS," filed Aug. 19, 2021, the disclosures of each of which are incorporated herein by reference in their entireties and for all purposes.

BACKGROUND

Technical Field

This disclosure relates to electronic assemblies and communication within electronic assemblies.

Description of Related Technology

High performance computing systems are important for many applications. However, conventional computing system designs can encounter significant communication latency in on-chip networks, leading to decreased performance.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

In some aspects, the techniques described herein relate to a method of routing a packet in a computing system, the method including: outputting a first bypass signal and a second bypass signal from a first computing node of an array of computing nodes, wherein the first bypass signal indicates to route a packet through a second computing node of the array of computing nodes, and wherein the second bypass signal indicates to turn the packet in a third computing node of the array of computing nodes; routing the packet through the second computing node based on the first bypass signal from the first computing node, wherein the packet is routed from the first computing node through the second computing node in a single clock cycle, and wherein the second computing node receives the first bypass signal by way of a faster route than the second computing node receives the packet; and turning the packet in the third computing node based on the second bypass signal, wherein the packet is received by the third computing node from the second computing node.

In some aspects, the techniques described herein relate to a method, wherein the third computing node receives a third bypass signal that is based on the second bypass signal by way of a faster route than the third computing node receives the packet.

In some aspects, the techniques described herein relate to a method, wherein the packet is routed through the third computing node in two clock cycles.

In some aspects, the techniques described herein relate to a method, wherein the packet includes a header portion and a data portion, and the header portion is routed one cycle ahead of the data portion.

In some aspects, the techniques described herein relate to a method, wherein routing the packet through the second computing node includes: routing the header portion in a first clock cycle; and routing the data portion in a second clock cycle.

In some aspects, the techniques described herein relate to a method, wherein routing the packet through the second computing node includes: storing the first bypass signal in a state element of the second computing node; routing the header from the first computing node to the second computing node based at least in part on the first bypass signal; and after routing the header from the first computing node to the second computing node, routing the data portion from the first computing node to the second computing node based at least in part on the first bypass signal.

In some aspects, the techniques described herein relate to a method, wherein the packet includes a plurality of sub-packets, each sub-packet includes a header and a data portion, and said routing the packet through the second computing node includes: routing the plurality of sub-packets from the first computing node to the second computing node; and comparing at least a portion of each header of each of the plurality of sub-packets.

In some aspects, the techniques described herein relate to a method, further including: determining that there is a header mismatch based on said comparing; and providing an error signal responsive to said determining.

In some aspects, the techniques described herein relate to a method, wherein routing the packet through the second computing node is further based one or more other packets waiting to exit the second computing node and an available capacity of a destination queue of the packet.

In some aspects, the techniques described herein relate to a method, further including outputting a third bypass signal from the second computing node, wherein the third bypass signal indicates to route another packet through a fourth computing node of the array of computing nodes.

In some aspects, the techniques described herein relate to a method, wherein when the first bypass signal indicates that the packet can bypass the second computing node, routing the packet from the first computing node to the second computing node includes routing the packet on a connection that does not allow the packet to turn at the second computing node.

In some aspects, the techniques described herein relate to a computing system including: a first computing node; and a second computing node, wherein the first and second computing nodes are included in a computing node array, and wherein the first computing node is configured to route a bypass signal on a first route to the second computing node and to route packet data to the second computing node on a second route, wherein the first route is faster than the second route, and wherein the bypass signal is indicative of whether to turn the packet data in the second computing node.

In some aspects, the techniques described herein relate to a computing system, further including a third computing node, wherein the first, second, and third computing nodes are included in a same row or column of the computing node array, and wherein the first computing node is configured to output a second bypass signal indicative of whether to turn the packet data at the third computing node.

In some aspects, the techniques described herein relate to a computing system, wherein the third computing node is configured to turn the packet and output the packet in two clock cycles.

In some aspects, the techniques described herein relate to a computing system, wherein the packet includes a header and a data portion, and the second computing node is configured to route the header to the third computing node at least one clock cycle before routing the data portion to the third computing node.

In some aspects, the techniques described herein relate to a computing system, wherein the packet includes a plurality of sub-packets, each sub-packet includes a header and a data portion, and the second computing node is configured to compare at least a portion of the header of each sub-packet.

In some aspects, the techniques described herein relate to a computing system, wherein the computing system is configured to route the packet through the second computing node in path between the first computing node and the third computing node in a single clock cycle.

In some aspects, the techniques described herein relate to a computing system, wherein the computing system is configured to perform neural network training.

In some aspects, the techniques described herein relate to a computing system, wherein a system on a wafer includes the computing node array.

In some aspects, the techniques described herein relate to a computing system, wherein the computing system is configured to determine the first route based at least partly on at least one of a number of other packets waiting to exit the second computing node or an available capacity of a destination queue for the packet.

BRIEF DESCRIPTION OF THE DRAWINGS

This disclosure is described herein with reference to drawings of certain embodiments, which are intended to illustrate, but not to limit, the present disclosure. It is to be understood that the accompanying drawings, which are incorporated into and constitute a part of this specification, and for the purpose of illustrating concepts disclosed herein and may not be to scale.

DETAILED DESCRIPTION OF THE PREFERRED EMBODIMENT

Figure 1:
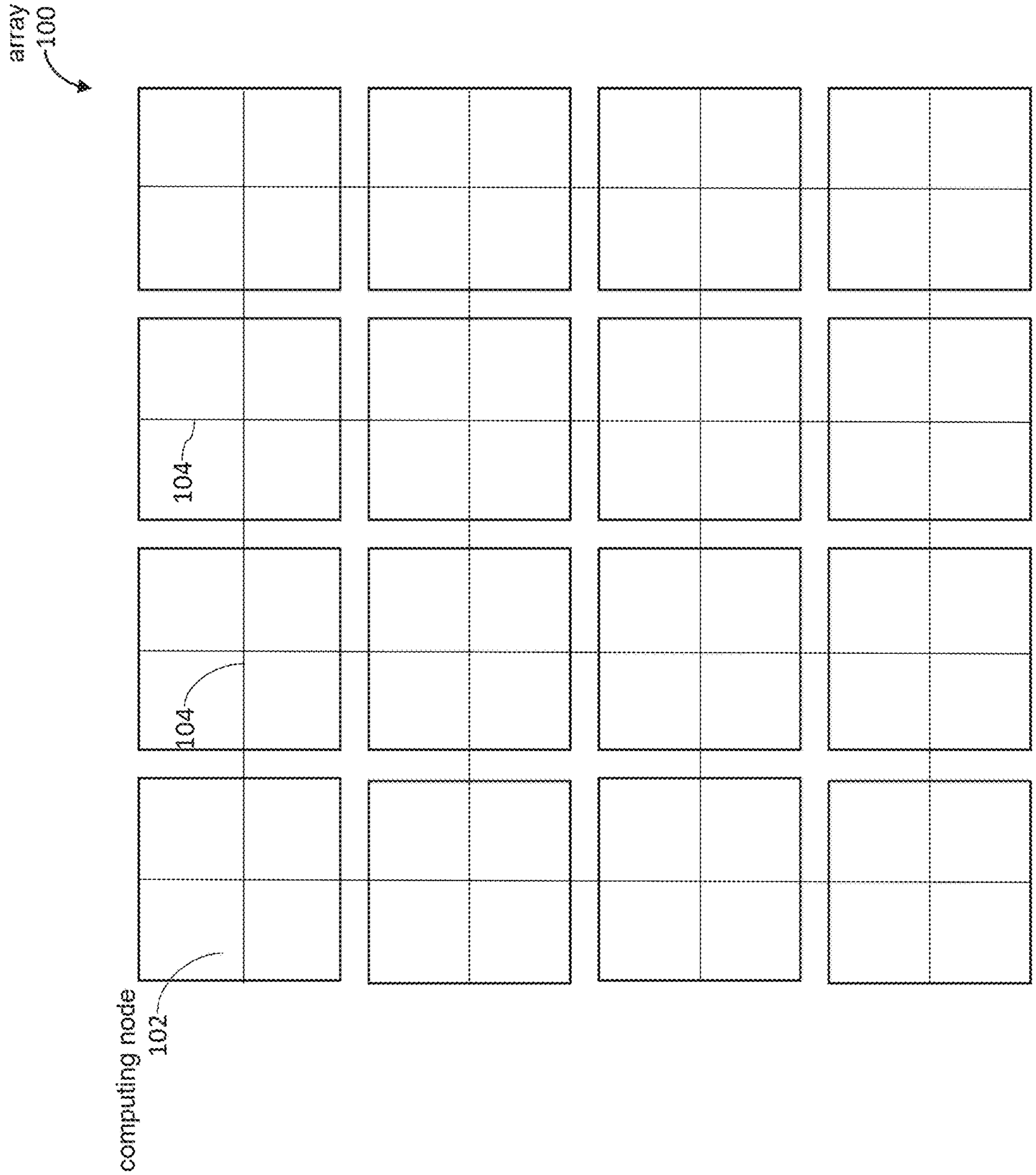
FIG. 1 illustrates an example array of computing nodes.

The following description of certain embodiments presents various descriptions of specific embodiments. However, the innovations described herein may be embodied in a multitude of different ways, for example, as defined and covered by the claims. In this description, reference is made to the drawings where like reference numerals may indicate identical or functionally similar elements. It will be understood that elements illustrated in the figures are not necessarily drawn to scale. Moreover, it will be understood that certain embodiments may include more elements than illustrated in a drawing and/or a subset of the elements illustrated in a drawing. Further, some embodiments may incorporate any suitable combination of features from two or more drawings.

FIG. 1 shows an example array of computing nodes that can be used in high performance computing systems and/or other settings where high computational density is desired. As shown in FIG. 1, an array 100 can include a plurality of computing nodes 102 arranged in a grid or other pattern. The computing nodes 102 can be arranged in rows and columns. Any suitable number of computing nodes 102 can be included in an array 100. For example, a computing node array can include on an order of 100 computing nodes 102 in certain applications. The array 100 can include routing lines 104 that can be used to enable communication between computing nodes 102 of the array 100. The array 100 can be implemented on a single integrated circuit die. A computing node 102 can be any suitable circuitry configured to provide one or more of computation, storage, control, communication, or monitoring functionality. The computing node 102 can be included in a central processing unit (CPU), graphics processing unit, application-specific integrated circuit (ASIC), system on a chip (SOC), or other die.

The computing nodes 102 of the array 100 can interface with each other to implement distributed computing functionality. In some embodiments, each computing node of the array 100 can execute computing operations that can include one or more of computation, storage, routing determinations, external communications, and so forth. In some embodiments, each computing node in the plurality of computing nodes 102 can be an instance of the same design. However, in some embodiments, an array can include two or more types of nodes with different capabilities, such as different routing capabilities, different computing capabilities (including, for example, no computing capabilities), different amounts of memory (e.g., static random access memory (SRAM)), different sensors (e.g., temperature, voltage, etc.), and so forth. In certain applications, the array 100 can be implemented on a system on a wafer.

In a multi-computing node network, for example as shown in FIG. 1, communication latency between computing nodes can have a significant impact on system performance. The computing nodes can be on a common die and, thus, aspects of this disclosure can achieve relatively low communication latency for on die communication. Embodiments described herein can facilitate communication between computing nodes that allow for data packets to travel across an on-chip network with a single cycle of latency per computing node. For example, a computing node maximum size can be selected or determined so that a packet can travel across a computing node in a single clock cycle. In a typical network, each die may operate at a frequency of about 2 gigahertz (GHz), for example 1 GHz, 1.5 GHz, 2 GHz, 2.5 GHz, 3 GHz, or any frequencies between these frequencies, or even more depending upon the specific dies. A typical computing node size can be about 1 $mm^2$, about 1 $cm^2$, etc. For a frequency of about 2 GHz, a packet would travel from one computing node to the next in 0.5 nanoseconds or less in order to complete the travel in a single cycle.

As a packet travels across the computing node, a network routing determination can be made regarding whether to route the packet straight, turn the packet, or that the packet has reached its destination. If a system waits for the packet to arrive at a computing node before making a routing decision regarding the routing path of the packet from the computing node, then the system may not be able to accomplish both receipt of the packet and making the routing decision within a single cycle. More specifically, using a single cycle to both transport the packet and to determine where to route the packet next to reach its destination can be difficult to accomplish in a single cycle without making computing node sizes smaller than desired. Accordingly, such approaches can be inefficient and have significant packet communication latency.

Embodiments of this disclosure can address inefficiencies with packet routing. In some applications, the width, height, or both of an on-chip network can be selected based at least in part on the time it takes a packet to travel on an average global wire, where a global wire can route signals between computing nodes. In some embodiments, a system can include a number of wider and/or thicker wires that can be used for carrying critical signals. For example, the wider or thicker wires can carry valid bits, a field indicating which virtual channel a packet is traveling in, and so forth. In some embodiments, there can be greater space between the wider or thicker wires to reduce coupling between wires. A thicker or wider wire can, in some cases, transport information more quickly than regular wires. However, only a limited number of such wires may be available. Such wires may take up significantly more space than a regular wire, for example as much space as about 3, about 4, or about 5 regular wires. In some embodiments, as a packet enters a computing node array, a processing routine can conduct a lookup in a routing table to determine which computing node row and column the packet should turn in. The wider or thicker wires can be in a higher level metal layer than narrower wires. For packets that are traveling within a die, a row/column identifier field or the like can be used directly without a routing table to determine where a packet can turn. In some embodiments, the processing routine can determine if the packet, after turning, will terminate at a different computing node or continue off the edge of the die.

In some embodiments, for individual computing nodes, the processing routine can determine (e.g., decode) whether a packet should turn at a computing node that is two network hops away. For example, if a packet is traveling horizontally and should turn at column 15, the system can be configured to determine this turn when the packet is at a computing node in column 13. This determination can be used to generate a bypass eligible signal. The bypass eligible signal can be communicated over a faster route (e.g., a thicker and/or wider wire) so that the decode bypass eligible determination and the transport of the packet across a computing node can be performed in a single clock cycle. For example, the processing routine can conduct a bypass eligibility determination at each computing node, such that the determination can occur in time to allow the packet to turn at the correct location.

In some embodiments, the bypass eligible signal can be carried on a wider or thicker wire as the packet leaves a neighboring computing node. For example, with continued reference to the example above, the bypass eligible signal can be carried on a wider or thicker wire as the packet leaves computing node 14. Thus, the control signal can arrive before the packet at column 15 and can be used to steer the packet's data.

In some embodiments, a packet can have two indicators related to bypassing computing nodes (e.g., whether to route through a computing node without turning). A "bypass" (BYP) signal can indicate if the packet is permitted to bypass the next computing node, and a "bypass next" (BYP_NEXT) signal can indicate if the packet is permitted to bypass a computing node that is two hops away. When a packet reaches the next computing node, the BYP_NEXT value can become the new BYP value, and a new BYP_NEXT value can be determined. By determining whether to bypass and route through the next two computing nodes (e.g., whether the packet is turning at the next computing node or the computing node after the next computing node), there can be sufficient time to determine the route and send the packet while reducing wasted cycles. In principle, a different number of operations could be used. For example, bypass signals can be determined three hops away, four hops away, and so forth. In some embodiments, the control signals can be carried on faster wires while the data travels on regular, slower wires. The faster wires for routing such control signals can be implemented on higher-level metal layers than slower wires for routing packet data. For example, a semiconductor device made according to modern processes can include multiple metal layers, e.g., ten layers, fifteen layers, or some other number of layers. Lower metal layers typically can be narrower and thinner than higher metal layers to accommodate high density and typically carry signals over a relatively short range. Layers higher in the stack typically have thicker/wider wires to support global communication and efficient distribution of power and/or clock signals. In some embodiments, the top one or two layers can be used for carrying bypass signals, and the next one or two layers can be used for carrying the bulk of the packets from node to node.

The number of operations to pre-determine can be based at least in part on the speed of the faster wires compared to the regular wires, the number of faster wires available, and so forth. For example, determining more hops in advance can allow more time for performing computations. Thus, for example, a packet can be adaptively routed based on congestion rather than statically routed based on destination node address. However, determining bypassing one or more nodes in advance can place additional demands on the faster wires, which can have constrained capacity.

Figure 2:
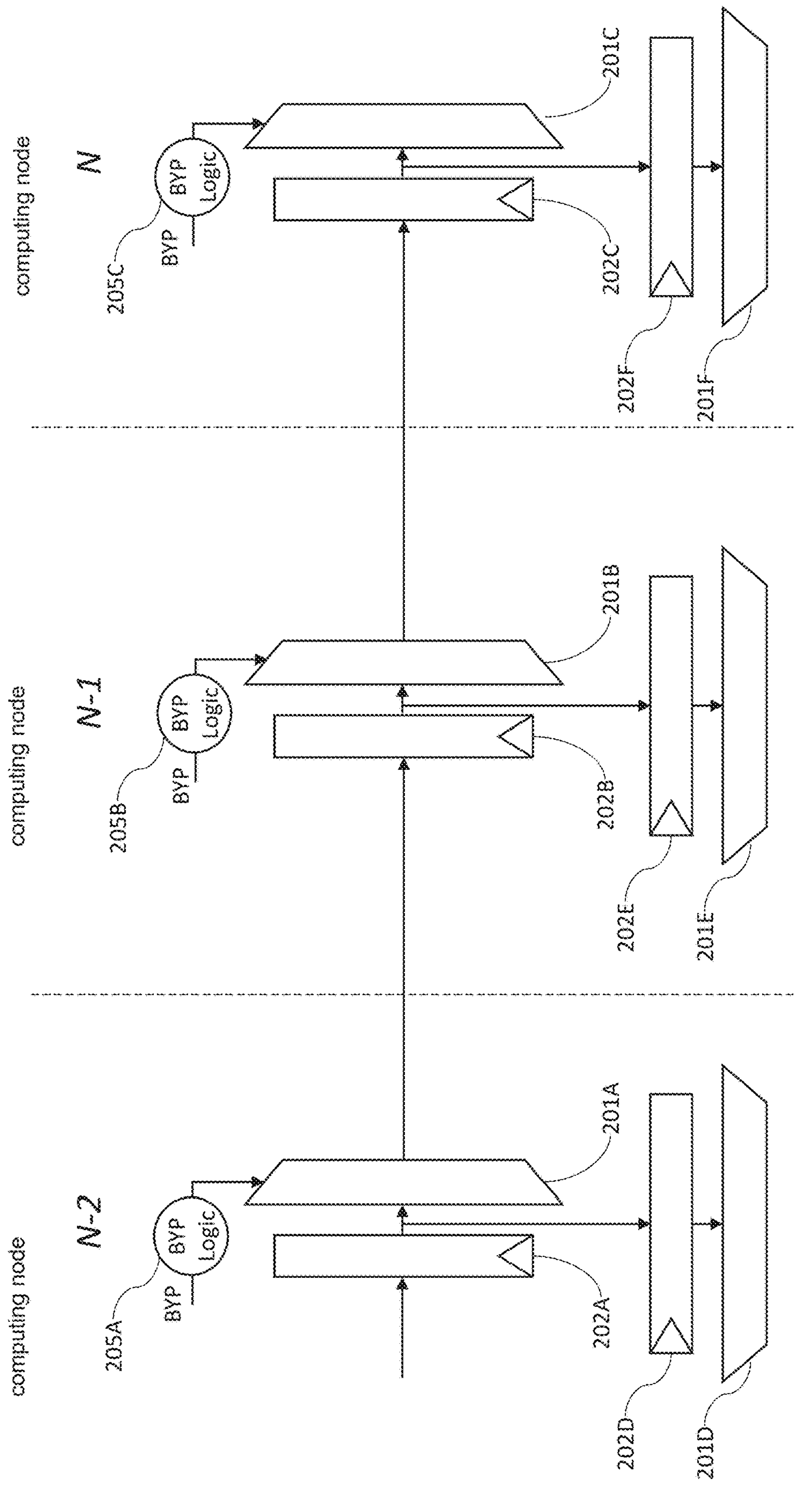
FIG. 2 illustrates an example of schematic diagram of computing nodes and packet routing according to some embodiments.
Figure 4:
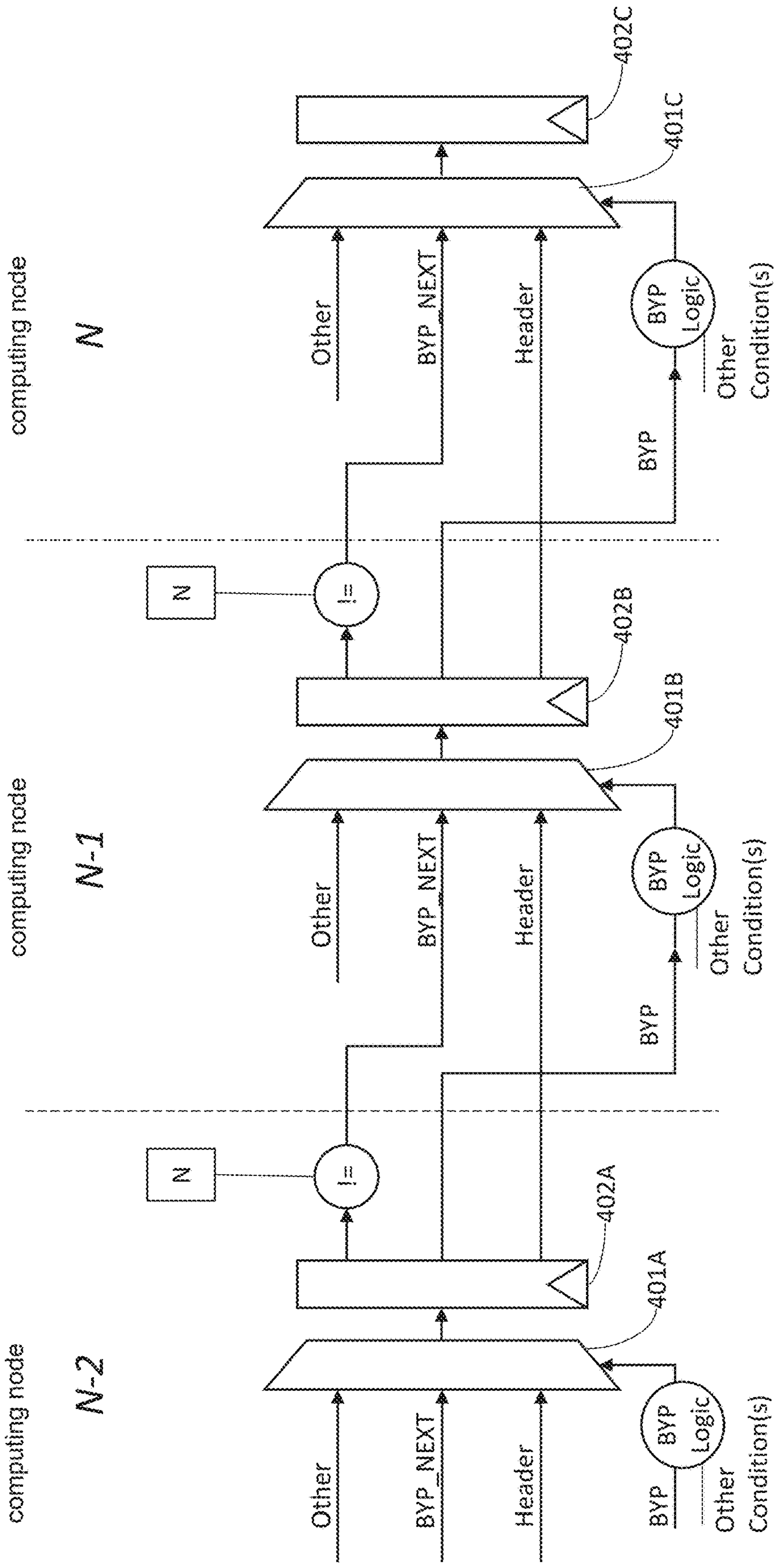
FIG. 4 is an illustration of computing nodes with bypass routing according to some embodiments.

FIG. 2 shows an example schematic diagram of computing nodes and packet routing according to some embodiments. As shown in FIG. 2, a packet can be routed to a computing node N from a computing node N-2, passing through N-1. Each computing node N, N-1, N-2 can include state elements (e.g., flip flops) 202A-202F that can be used to store routing information, packet information, or both. Each computing node N, N-1, N-2 can include one or more multiplexers 201A-201F which can be used to, based on routing information, direct packets forward or cause packets to turn. Routing the packet forward allows the packet to continue along a row or column of an array of computing nodes. Turning the packet involves having the packet propagate in an orthogonal direction relative to the direction the packet is received by a computing node (e.g., the packet can be received by way of a route along a row of an array and be output on a route along a column of the array). As shown in FIG. 2, packets may travel from left to right and/or top to bottom. However, right to left travel and/or bottom to top travel can be enabled with additional state machines, multiplexers, and so forth. While FIG. 2 shows state elements 202A-202F coming before their respective multiplexers 201A-201F, it will be appreciated that other configurations are possible in accordance with principles and advantages disclosed herein, for example, as depicted in FIG. 4. Accordingly, state elements can capture data after multiplexers 201A-201F in some embodiments.

Each computing node N-2, N-1, N can receive and/or generate a bypass signal BYP. The bypass signal BYP is indicative of whether to continue routing the packet forward along a row or column. Bypass logic 205A, 205B, 205C of a computing node can determine whether to route the packet forward based at least partly on the bypass signal BYP. When the bypass logic 205A, 205B, or 205C determines to route the packet forward, a select signal for a respective multiplexer 201A, 201B, or 201C can be asserted to select the packet. This can allow the packet to propagate along a same row or column as the packet was received by the computing node. When the bypass logic 205A, 205B, or 205C determines to turn the packet, the packet can be stored by respective state elements 202D, 202E, or 202F. The packet can then be selected by asserting a select signal for a respective multiplexer 201D, 201E, 201F in a following clock cycle to cause the packet to propagate outside the computing node on a route that is perpendicular to a route on which the computing node received the packet.

Figure 3:
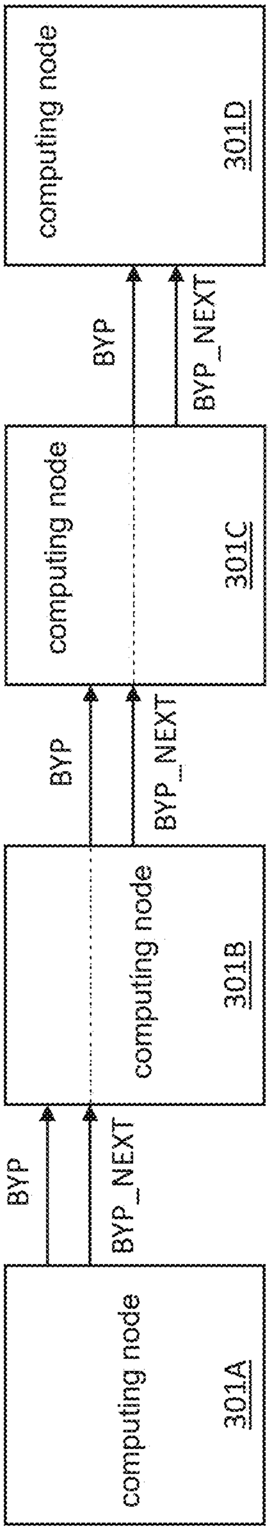
FIG. 3 illustrates an example of packet routing according to some embodiments.

FIG. 3 illustrates an example of packet routing according to some embodiments. Packet data can have associated therewith at computing node 301A a value BYP and a value BYP_NEXT. BYP can determine whether or not the packet data can bypass at 301B, while BYP_NEXT can indicate whether the packet data can bypass at computing node 301C. At computing node 301B, the value of BYP_NEXT can be assigned to BYP, and a new BYP_NEXT value can be set, which indicates whether the packet data can bypass at computing node 301C. Similarly, at computing node 301C, BYP can take on the value of BYP_NEXT, and a new BYP_NEXT value can be set that indicates whether the packet data can bypass computing node 301D. In some embodiments, the BYP and/or BYP_NEXT values can be provided to a multiplexer to determine whether or not bypassing is permissible (e.g., whether or not the packet has a turn at a computing node one or two hops away). Bypass logic of a computing node can generate and/or process the BYP and BYP_NEXT signals. The bypass (BYP) and bypass next (BYP_NEXT) signals can be active high signals. Alternatively, either or both of these signals can be logically inverted and processed accordingly.

FIG. 4 is a schematic diagram of computing nodes with bypassing according to some embodiments. As shown in FIG. 4, computing nodes N-2, N-1, and N can have multiplexers 401A-401C that be used for determining whether to route a signal horizontally and can have state elements 402A-402C that can be used to, for example, store routing information (e.g., bypass signals) and/or other information. Bypass (BYP), bypass next (BYP_NEXT), headers, and other signals can be provided to multiplexer 401A at computing node N-2.

The BYP_NEXT value for computing node N-2 can be the BYP value for computing node N-1. The BYP_NEXT value for computing node N-1 can be determined by, for example, comparing the current computing node (e.g., N-2) to the computing node where a packet will turn (e.g., N). If the turning computing node (e.g., N) is two hops away from the current computing node (e.g., N-2), then the BYP_NEXT value for computing node N-1 can be set to a value indicating to turn at computing node N (e.g., a value of zero). Otherwise, BYP_NEXT for node N-1 can be set to a value indicating to route the packet forward at computing node N without turning (e.g., a value of one). Thus, for example, if an incoming packet to computing node N-2 should turn at computing node N, BYP_NEXT and BYP can both initially be set to a value indicating that it is okay to bypass node N-2 and to bypass node N-1. After computing node N-2, BYP can take on the previous value of BYP_NEXT for computing node N-1 (e.g., 1), indicating that node N-1 can be bypassed. A new BYP_NEXT can be computed and, in the current example of a packet that turns at computing node N, be set to zero. When the packet is at node N-1, the BYP value can be set to the previous value of BYP_NEXT (e.g., zero), indicating to turn the packet at computing node N and that the packet cannot bypass computing node N.

Figure 5:
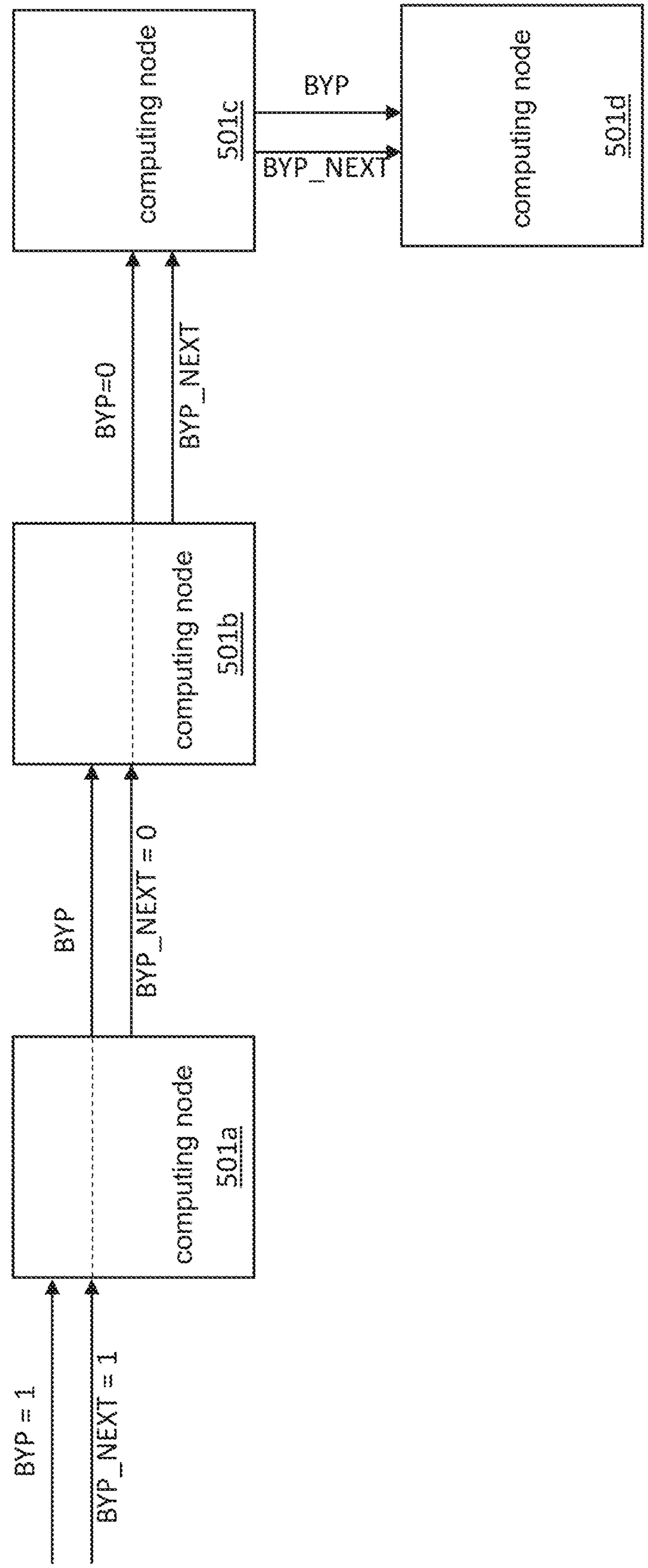
FIG. 5 illustrates an example of routing that uses bypass and bypass next signals for bypassing computing nodes in an array according to some embodiments.

FIG. 5 illustrates an example of routing that uses the bypass (BYP) and bypass next (BYP_NEXT) values according to some embodiments. The BYP and BYP_NEXT signals are active high signals in FIG. 5. As shown in FIG. 5, computing node 501*a* can receive values BYP=1 and BYP_NEXT=1, indicating that bypass is permissible for computing nodes 501*a* and 501*b* (e.g., that the packet does not turn at either 501*a* or 501*b*). After computing node 501*a*, BYP=1 (i.e., the previous value of BYP_NEXT) and BYP_NEXT=0, indicating that bypass is permissible for computing node 501*b*, but not for 501*c*. That is, the packet associated with the bypass signals will turn at computing node 501*c*, and thus 501*c* should not be bypassed. Rather, the bypass signals can turn and pass to computing node 501*d*. In some embodiments, the packet data can follow one computing node (e.g., one hop) behind the packet header. Bypass signals can be routed with the packet header and stored by state elements for use with the packet data.

Figure 6:
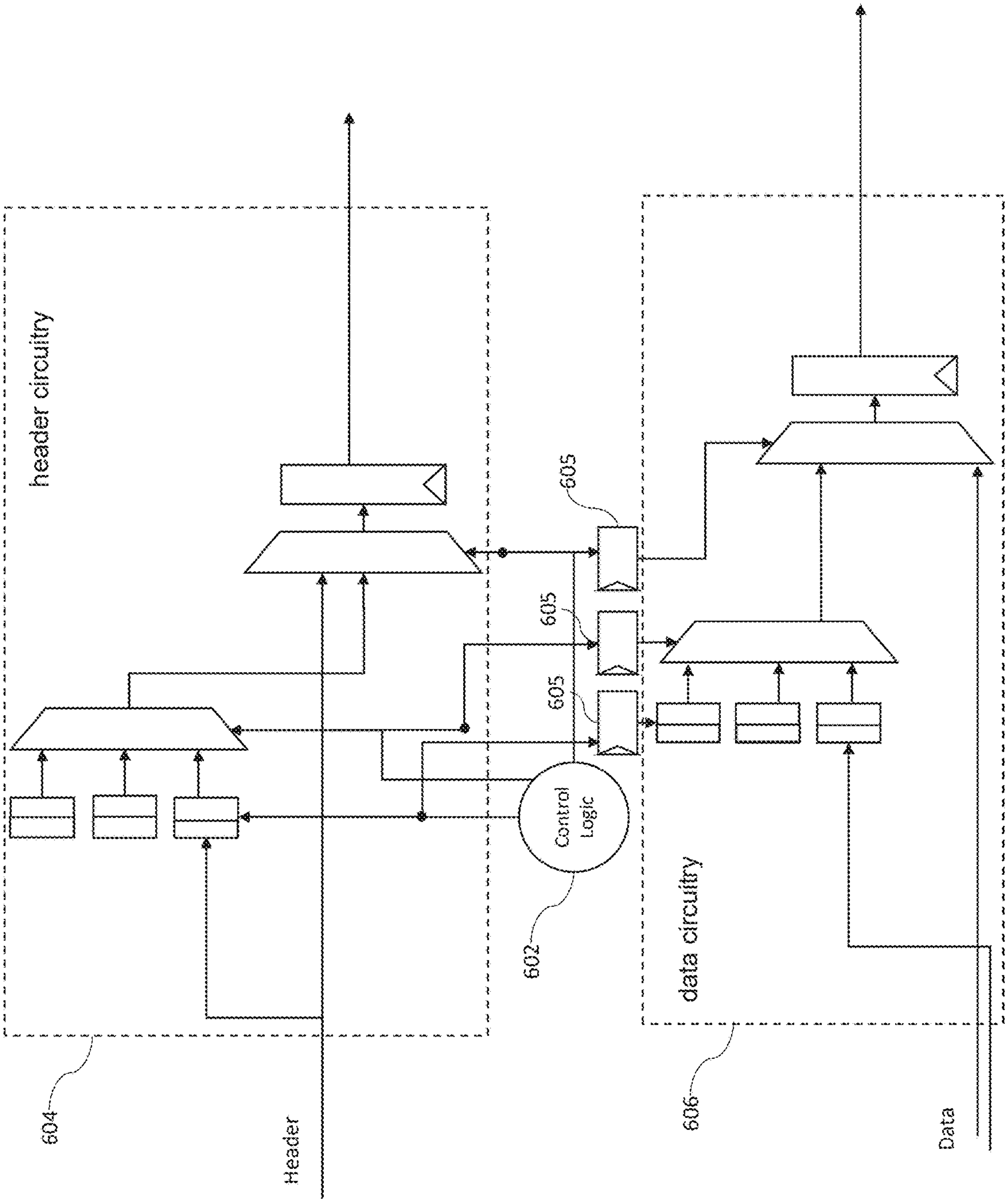
FIG. 6 illustrates an example of packet routing according to some embodiments.

FIG. 6 illustrates an example of packet routing according to some embodiments. As shown in FIG. 6, control signals can be generated and used to route both the header and the data portion of a packet through a computing node. In some embodiments, a configuration as illustrated in FIG. 6 can be used to separately route the header and data portions of a packet. For example, a header can be routed in one cycle, and the control signals can be staged and fan out to route the data one cycle behind the header. The control signal can be a bypass signal. The bypass signal can be used to route a header in one cycle and stored by a state element so that the bypass signal can be used in the next cycle to route the packet data.

As shown in FIG. 6, control logic 602 can be used to steer the header using header circuitry 604. The control logic 602 can generate bypass signals and/or one or more control signals that are stored and used in a next cycle (e.g., the cycle immediately after the header is steered) to route the data using data circuitry 606. For example, state elements 605 can store the bypass signals and/or other control signals. In some embodiments, the header circuitry 604 and/or data circuitry 606 can include one or more buffers for storing control signals, packet bits, and/or other information for steering packets.

In some embodiments, a system can have a bypass control mechanism that can give priority to packets that are eligible to bypass a particular computing node, while still enabling other traffic to exit the computing node. In some embodiments, whether or not a packet bypasses a computing node can depend on more than whether or not the packet is eligible to bypass (e.g., whether or not BYP is yes). For instance, bypassing can depend on the number of packets waiting (e.g., packets ahead of an arriving packet that did not bypass or exit in a previous cycle, packets waiting to turn at the computing node, etc.), whether or not queues are full or near capacity, and so forth. For example, if a destination or intermediate queue that the packet will route to is full or near capacity, there may be little or no benefit to expediting the packet, and resources may instead be used for routing other packets.

In some embodiments, a packet can have a smaller header portion (e.g., about 20 bits) and a larger data portion (e.g., about 200 bits, about 400 bits, about 800 bits, etc.). The header portion can be used for controlling the packet's path through the network. In some embodiments, the header can proceed through the network using the mechanisms described herein, and the rest of the packet (e.g., the data) can follow one cycle after the header. In some embodiments, the same signals that control the header can be stored in a state element, such as a flip flop, and in the following cycle can fan out to control the rest of the packet.

In some embodiments, a packet can be large compared to other packets. For example, the packet can be a data packet that carries a relatively large amount of data. In some embodiments, the processing routine can divide the packet into multiple, smaller packets, for example two packets, three packets, four packets, and so forth. The processing routine can duplicate the header and send a fraction of the data (e.g., half for two packets, one fourth for four packets, and so forth) with each copy of the header. In some embodiments, the processing routine can be configured so that the headers travel through the system in lockstep, and thus the fanout to the data can also always happen within a single clock cycle. In some embodiments, the processing routine can conduct a parity check to verify that all copies of the data remain in lockstep.

Figure 7:
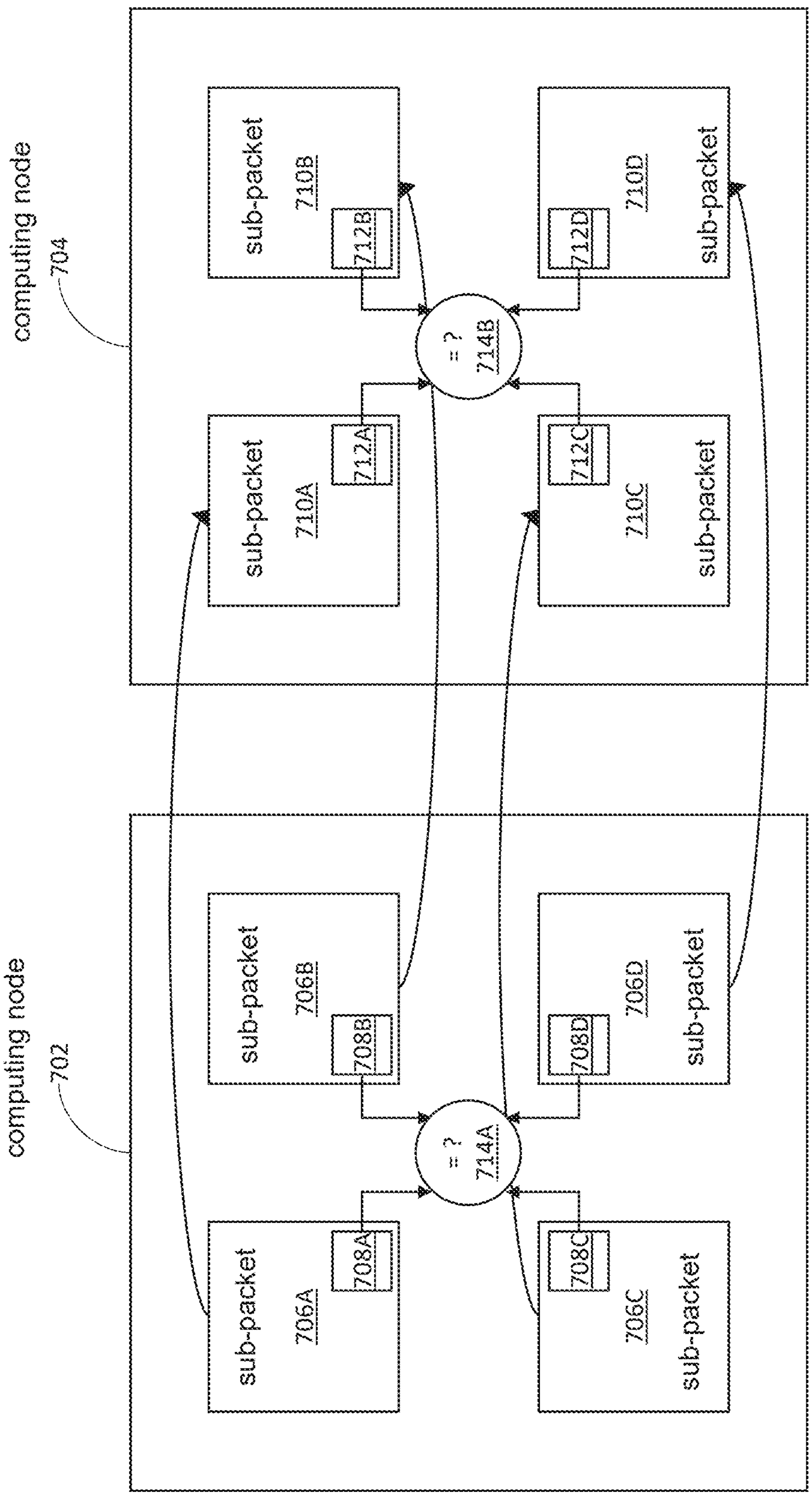
FIG. 7 is an example illustration of sub-packet processing and parity checking according to some embodiments.

FIG. 7 is an example illustration of parity checking according to some embodiments. A packet can be split into four sub-packets 706A-706D, each having a header 708A-708D. At least part of each of the headers 708A-708D can be identical to each other. The four sub-packets 706A-706D can each carry a subset of the data of a larger packet. The packets can travel from a first computing node 702 to a second computing node 704. After four packets arrive at the second computing node 704, a system can be configured to check the headers 712A-721D at comparator 714B. In some embodiments, the headers 708A-708C can be checked at comparator 714A after arriving from a previous computing node and/or before leaving computing node 702 to travel to computing node 704. If the transmission occurred without error, the at least part of the sub-packets 710A-710D should be identical to the sub-packets 706A-706D, and at least part of the headers 712A-712D should be identical to the headers 708A-708D. Moreover, at least part of each of the headers 712A-712D should all be identical to each other. In addition to dividing up large packets for transmission, in some embodiments, even smaller packets may be divided, and the check 714B can act as an integrity check to help ensure that packets are being carried through the network correctly.

If there are unexpected differences in the headers 712A-712D, this can indicate a problem in the transmission of the of the packets from the first computing node 702 to the second computing node 704. In some embodiments, the system can be configured to provide an error signal, to reboot, and/or to take other actions. In some embodiments, if there is an unexpected mismatch in the headers 712A-712D, the system can be configured to adjust one or more operating parameters. For example, the system can reduce an operating frequency, increase an operating voltage, and so forth.

In some embodiments, when a packet turns, it can take one extra clock cycle to turn the packet. This can occur because, for example, the flip flops and logic for horizontal parts of the network and for vertical parts of the network often do not reside in the same (or adjacent) physical location on the die. Thus, in some embodiments, turning the packet can take two clock cycles, whereas a packet may be routed straight through a computing node in a single clock cycle. Thus, it may be advantageous to minimize the number of turns taken to route a packet from a source to a destination.

The systems and methods herein can be used in a variety of processing systems for high performance computing and/or computation-intensive applications, such as neural network processing, neural network training, machine learning, artificial intelligence, and so forth. In some applications, the systems and methods described herein can be used in generating data for an autopilot system for a vehicle (e.g., an automobile), other autonomous vehicle functionality, and/or Advanced Driving Assistance System (ADAS) functionality.

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

What is claimed is:

1. A method of routing a packet in a computing system, the method comprising:

outputting a first bypass signal and a second bypass signal from a first computing node of an array of computing nodes, wherein the first bypass signal indicates to route a packet along a first direction through a second computing node of the array of computing nodes, and wherein the second bypass signal indicates to turn the packet in a third computing node of the array of computing nodes to route the packet along a second direction orthogonal to the first direction;

routing the packet along the first direction through the second computing node based on the first bypass signal from the first computing node, wherein the packet is routed from the first computing node through the second computing node in a single clock cycle, and wherein the second computing node receives the first bypass signal by way of a faster route than the second computing node receives the packet; and turning the packet in the third computing node based on the second bypass signal to route the packet along the second direction, wherein the packet is received by the third computing node from the second computing node.

2. The method of claim 1, wherein the third computing node receives a third bypass signal that is based on the second bypass signal by way of a faster route than the third computing node receives the packet.

3. The method of claim 1, wherein the packet is routed through the third computing node in two clock cycles.

4. The method of claim 1, wherein the packet comprises a header portion and a data portion, and the header portion is routed one cycle ahead of the data portion.

5. The method of claim 4, wherein routing the packet through the second computing node comprises:
routing the header portion in a first clock cycle; and
routing the data portion in a second clock cycle.

6. The method of claim 4, wherein routing the packet through the second computing node comprises:
storing the first bypass signal in a state element of the second computing node;
routing the header portion from the first computing node to the second computing node based at least in part on the first bypass signal; and
after routing the header portion from the first computing node to the second computing node, routing the data portion from the first computing node to the second computing node based at least in part on the first bypass signal.

7. The method of claim 1, wherein the packet comprises a plurality of sub-packets, each sub-packet comprises a header and a data portion, and said routing the packet through the second computing node comprises:
routing the plurality of sub-packets from the first computing node to the second computing node; and
comparing at least a portion of each header of each of the plurality of sub-packets.

8. The method of claim 7, further comprising:
determining that there is a header mismatch based on said comparing; and
providing an error signal responsive to said determining.

9. The method of claim 1, wherein routing the packet through the second computing node is further based one or more other packets waiting to exit the second computing node and an available capacity of a destination queue of the packet.

10. The method of claim 1, further comprising outputting a third bypass signal from the second computing node, wherein the third bypass signal indicates to route another packet through a fourth computing node of the array of computing nodes.

11. The method of claim 1, wherein when the first bypass signal indicates that the packet can bypass the second computing node, routing the packet from the first computing node to the second computing node comprises routing the packet on a connection that does not allow the packet to turn at the second computing node.

12. A computing system comprising:
a first computing node; and
a second computing node, wherein the first and second computing nodes are included in a computing node array,
wherein the first computing node is configured to route a bypass signal on a first route to the second computing node and to route packet data to the second computing node on a second route, wherein the first route is faster than the second route, and wherein the bypass signal is indicative of whether to turn the packet data from a first routing direction to a second routing direction that is orthogonal to the first routing direction in the second computing node.

13. The computing system of claim 12, further comprising a third computing node, wherein the first, second, and third computing nodes are included in a same row or column of the computing node array, and wherein the first computing node is configured to output a second bypass signal indicative of whether to turn the packet data at the third computing node.

14. The computing system of claim 13, wherein the third computing node is configured to turn the packet data and output the packet data in two clock cycles.

15. The computing system of claim 13, wherein a packet comprises a header and a data portion, and the second computing node is configured to route the header to the third computing node at least one clock cycle before routing the data portion to the third computing node, and the data portion comprises the packet data.

16. The computing system of claim 13, wherein a packet comprises a plurality of sub-packets, each sub-packet comprises a header and a data portion, the data portion comprising the packet data, and the second computing node is configured to compare at least a portion of the header of each sub-packet.

17. The computing system of claim 13, wherein the computing system is configured to route the packet data through the second computing node in path between the first computing node and the third computing node in a single clock cycle.

18. The computing system of claim 12, wherein the computing system is configured to perform neural network training.

19. The computing system of claim 12, wherein a system on a wafer comprises the computing node array.

20. The computing system of claim 12, wherein the computing system is configured to determine the first route based at least partly on at least one of a number of other packets waiting to exit the second computing node or an available capacity of a destination queue for the packet data.

* * * * *